United States Patent [19]
Ingham, Jr.

[11] 3,709,317
[45] Jan. 9, 1973

[54] RESERVE FLUID VALVE POSITION INDICATOR

[75] Inventor: John W. Ingham, Jr., Wauwatosa, Wis.

[73] Assignee: AMF Incorporated

[22] Filed: Oct. 1, 1970

[21] Appl. No.: 77,134

[52] U.S. Cl............180/103, 200/61.86, 340/52 D
[51] Int. Cl...........................B60q 9/00, B60q 1/00
[58] Field of Search............180/82, 103; 340/52 D; 200/61.86

[56] References Cited

UNITED STATES PATENTS 2,973,009   2/1961   Kazyaka.....................200/61.86 X
3,115,559   12/1963  Cass et al. .....................200/61.89

*Primary Examiner*—Leo Friaglia
*Assistant Examiner*—John P. Silverstrim
*Attorney*—George W. Price and Walter Lewis

[57]  ABSTRACT

An indicator light which is operated by the reserve fuel valve indicates when the motorcycle is operating on its reserve fuel supply.

1 Claim, 5 Drawing Figures

PATENTED JAN 9 1973

INVENTOR.
JOHN W. INGHAM, JR.
BY
*Walter Lewis*
ATTORNEY

INVENTOR.
JOHN W. INGHAM, JR
BY
Walter Lewis
ATTORNEY

3,709,317

RESERVE FLUID VALVE POSITION INDICATOR

This invention relates to an improvement in motorcycles, and more particularly, to an improvement in the reserve fuel supply system therefor.

In current motorcycles after the fuel tank is nearly empty the fuel supply to the engine is automatically cut off and the rider must then intentionally open a reserve fuel supply valve to use the remaining portion of gasoline. This is a safety feature so that the rider will not unknowingly run out of gas. In other words, when he opens the reserve fuel valve he knows he's almost out of gas and needs to tank up again as soon as possible. However, sometimes the rider will forget he's on reserve fuel supply and will still run out of gas. This can happen by the rider returning home without filling up again. When he starts up the next morning he may have forgotten he was on reserve fuel supply the night before. Thus, he'll drive off without refilling and then run out of gas out on the road.

It is an object of this invention to overcome the above described problem.

In the invention, an indicator light is provided to signal to the rider when he's on reserve fuel supply. The light is on the control console of the motorcycle since this is referred to frequently when the rider is riding his cycle. In addition, the switch for operating the light is incorporated into the motorcycle in a low cost and foolproof manner adjacent to the reserve fuel supply valve so that when this valve is opened the switch is automatically operated to turn the light on. Furthermore, the light and switch are electrically tied into the ignition switch for the motorcycle. Thus, when the motorcycle is turned off the light isn't draining the battery. However, the instant the ignition switch is operated to run the motorcycle the light goes back on.

The features of the invention which are believed to be novel are set forth with particularity in the appended claims. The invention itself, however, both as to its organization and operation, together with further objects and advantages thereof, may best be understood by reference to the following description taken in connection with the accompanying drawings in which:

Figure 1:
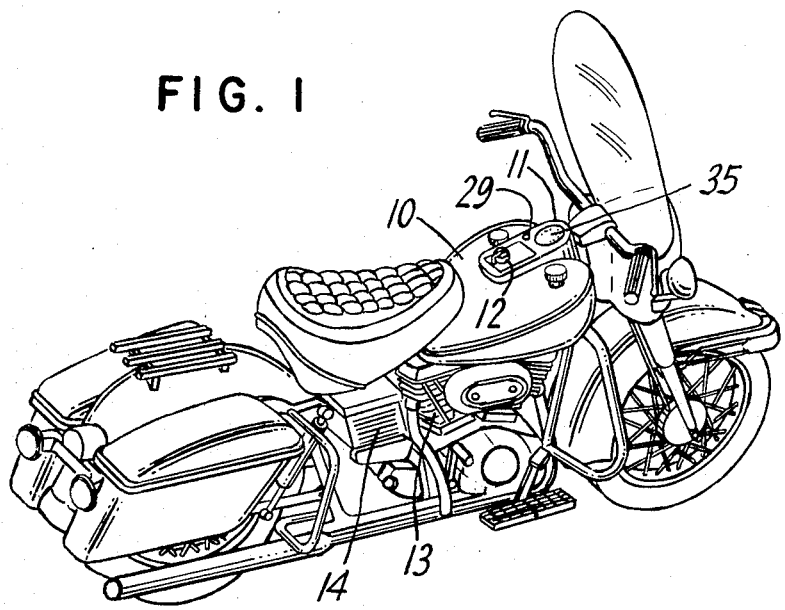
FIG. 1 is a perspective view of a motorcycle having my invention.
Figure 2:
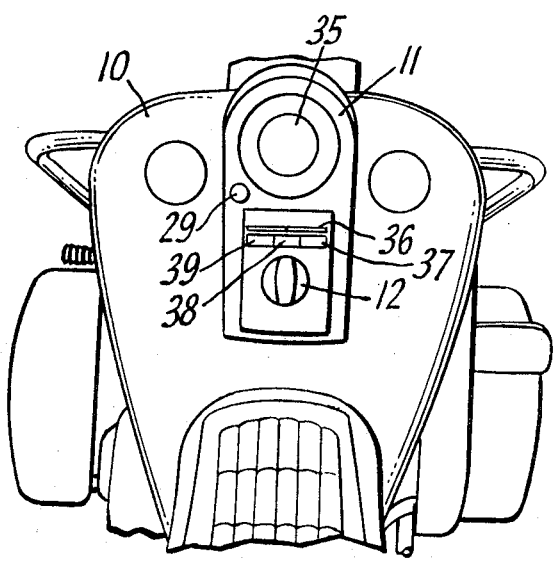
FIG. 2 is a broken away enlarged top plan view thereof.
Figure 3:
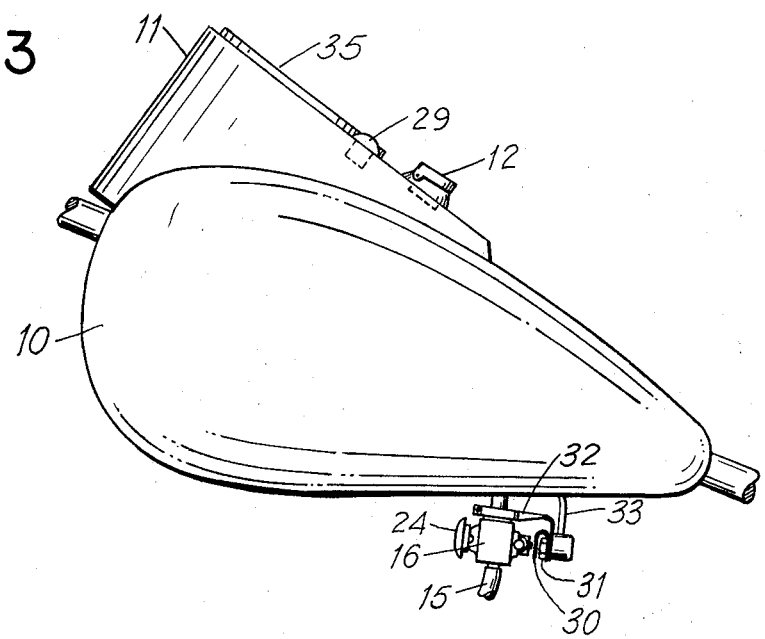
FIG. 3 is a broken away enlarged side elevation view thereof showing the opposite side thereof from that shown in FIG. 1.

Turning now particularly to the drawings, FIGS. 1–3 show a motorcycle having a gas tank 10 having a control console or instrument panel 11 thereon. The console 11 includes a key operated ignition switch 12 for electric starting of the engine 13 off an electric storage battery 14. A fuel line 15, see FIG. 3, extends from the tank 10 to the engine 13, and just below the tank 10 the line 15 has a double fuel line control valve 16. Valve 16 is part of a fuel filter assembly 17, see FIG. 4, mounted in the bottom of tank 10.

Figure 4:
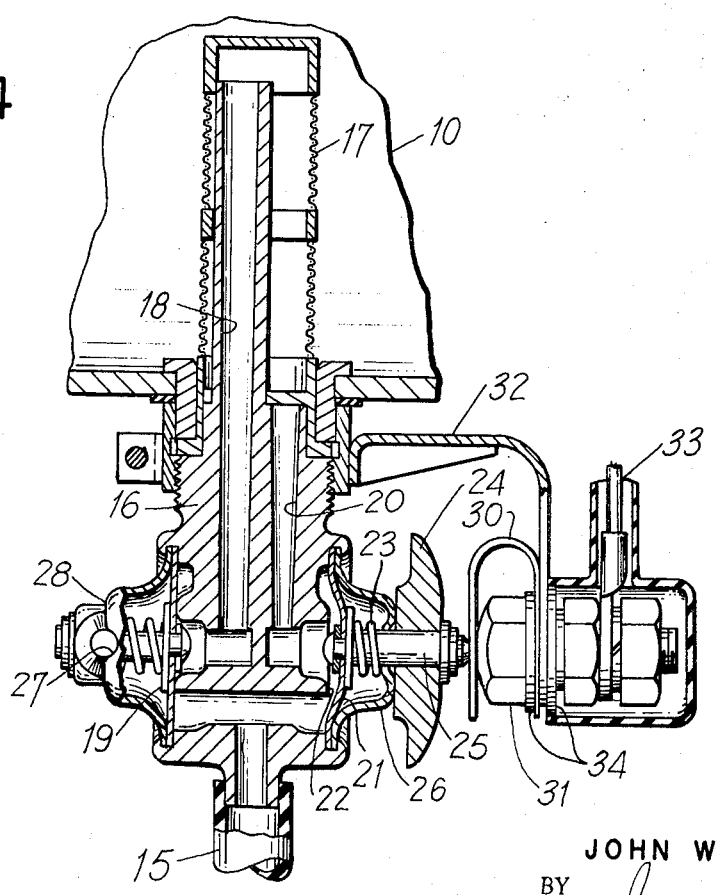
FIG. 4 is an enlarged broken away view of the lower right hand corner part of FIG. 3 to better show the details of the reserve fuel valve and light switch.

The double valve and filter assembly 16, 17 include a main fuel valve supply conduit 18 controlled by a hand operated valve 19 and a reserve fuel supply conduit 20 controlled by a hand operated valve 21. The construction and operation of the main and reserve valves 19 and 21 are the same. Thus, they are flexible diaphragm type valves that open and close on valve seats 22. They are biased to closed position by a spring 23. The valves are opened or closed by turning valve handles 24 ninety degrees. The springs 23 are mounted on stems 25 which connect the handles 24 to the center of the valve diaphragms. The valves are contained in valve housings 26. The housings 26 are rather bell-shaped and have a horizontally aligned groove 27. In FIG. 4 the handle 24 of the reserve valve 21 has been turned 90° to the vertical position so that the handle is out of the groove 27 and bottoms on the high point 28 of the valve housing 26. This is the valve open position. The handle for the main valve 19 is in its horizontal position in the groove 27 and this is the valve closed position. Thus, when the valve handle 24 is in the "out" position the valve is open, and in the "in" position the valve is closed. In FIG. 3 the main valve 19 is shown open and the reserve valve 21 is shown closed. In the reserve valve open position shown in FIG. 4 the reserve valve handle 24 has been moved "out" or to the right so as to turn a reserve fuel indicator light 29 on. The light 29 is shown in FIGS. 1–3 as being mounted on the console or panel 11.

Figure 5:
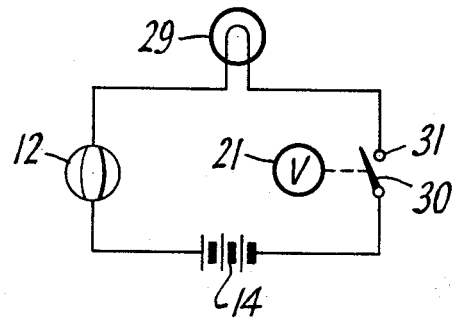
FIG. 5 is a diagramatic illustration of the electric circuit for the reserve fuel valve switch and indicator light.

The light 29 is turned on by the reserve fuel valve handle 24 closing a pair of electric contacts 30, 31. Closure of contacts 30, 31 connects the light 29 in series with the battery 14 and ignition switch 12, see FIG. 5, so as to light it up whenever the ignition switch is operated to energize the electrical systems of the motorcycle, such as to start the engine or put its running lights on.

The indicator light switch 30, 31 is mounted on the fuel line 15 adjacent to the reserve fuel supply valve 21 by a strap 32. Strap 32 is connected to the double valve 16 just below the tank 10 and carries the contacts 30, 31. Contact 31 is a fixed one whereas contact 30, which is in the form of a U-shaped resilient member, is adapted to have its free end moved into and out of engagement with contact 31. Contact 31 is actually a stud for mounting the light switch 30, 31 and an electric lead 33 to the strap 32.

When the handle 24 of the valve 21 is operated to open the valve the handle is moved to its "out" position so that it engages the contact 30 to push it into engagement with contact 31. If the handle is turned ninety degrees to the valve closed position the handle is moved "in" or away from the free end of contact 30 so that it is free to spring away from contact 31 to open the switch. The contact 30 and strap 32 are clamped on the stud contact 31 between a pair of insulating washers 34 so as to electrically isolate the contact 30 from the contact 31 except when the free end of contact 30 is pushed into physical engagement with contact 31.

Turning to FIG. 2, the control console or instrument panel 11 has some of the usual indicators thereon. This can comprise a speedometer 35, a turn signal indicator 36, an oil indicator 37, a neutral indicator 38, and a high beam or generator indicator 39. The ignition switch 12 can be a convention key lock type having several positions such as off, parking lights only, ignition only, and ignition and lights. The reserve fuel light and switch are connected in series with the battery through the ignition switch in the manner illustrated in FIG. 5 so that whenever the ignition switch is turned to energize the electrical systems of the motorcycle, such as to start it up, the light 29 will go on and stay on so long as the engine is running should the valve 21 be open.

While there has been shown and described a particular embodiment of the invention, it will be obvious to those skilled in the art that changes and modifications may be made without departing from the invention, and therefore, it is intended by the appended claims to cover all such changes and modifications as fall within the true spirit and scope of the invention.

What is claimed as new and desired to be secured by Letters Patent of the United States is:

1. In a motorcycle having an engine, a fuel tank, an electric battery, a fuel line extending from the tank to the engine, and a manually operable reserve fuel supply valve in said fuel line, an indicator light and an electric switch for controlling said light, said switch being mounted adjacent to said valve, said light and switch being electrically connected to said battery, and said switch being operated to closed position by operation of said valve to open position, wherein said motorcycle includes a control console having an ignition switch positioned thereon, said light being positioned on said console, and said switches and light being connected to said battery, and wherein said valve comprises part of a fuel filter assembly mounted in the bottom of said tank, said light switch comprising a pair of spaced relatively movable contacts, said contacts being mounted adjacent to said valve by a strap mounted on said fuel line, and said valve comprising a handle having a closed "in" position and an open "out" position, said handle being adapted in the open position of said valve to abut one of said contacts and move it into engagement with the other contact.

* * * * *